United States Patent [19]

Hartzband

[11] Patent Number: 4,899,290

[45] Date of Patent: Feb. 6, 1990

[54] SYSTEM FOR SPECIFYING AND EXECUTING PROTOCOLS FOR USING ITERATIVE ANALOGY AND COMPARATIVE INDUCTION IN A MODEL-BASED COMPUTATION SYSTEM

[75] Inventor: David J. Hartzband, Nashua, N.H.

[73] Assignee: Digital Equipment Corporation, Maynard, Mass.

[21] Appl. No.: 109,555

[22] Filed: Oct. 16, 1987

[51] Int. Cl.$^4$ .............................................. G06F 15/20
[52] U.S. Cl. .................................. 364/513; 364/200; 364/275.9; 364/300; 364/274.4
[58] Field of Search ........ 364/513, 300, 200 MS File, 364/900 MS File, 513.5; 382/14, 15, 30, 34, 36, 50; 381/41-50

[56] References Cited

U.S. PATENT DOCUMENTS

| | | | |
|---|---|---|---|
| 4,403,114 | 9/1983 | Sakoe | 364/513 X |
| 4,467,437 | 8/1984 | Tsuruta et al. | 382/30 X |
| 4,479,236 | 10/1984 | Sakoe | 382/3 X |
| 4,581,762 | 4/1986 | Lapidus et al. | 364/559 X |

OTHER PUBLICATIONS

David Hartzband et al., "The Provision of Induction in Data Model Systems: I. Analogy", 1987, pp. 5-21, International Journal of Approximate Reasoning, vol. 1.
Mary L. Gick and Keith J. Holyoak, "Schema Induction and Analogical Transfer", 1983, 1-38, Cognitive Psychology, vol. 15, No. 1.
Dedre Gentner, "Structure-Mapping: A Theoretical Framework for Analogy", 1983, 155-170; Cognitive Science, vol. 7.
David Hartzband et al., "The Provision of Induction in Data Model Systems: II. Symmetric Comparison", pp. 1-13; 1988; International Journal of Approximate Reasoning, vol. 2.
David Hartzband, "The Anatomy of Knowledge Base Management", pp. 333-340, 1985; Proceedings 1st Annual A. I. and Advanced Computer Technology Conference, Long Beach, Calif.
David Hartzband et al., "Enhancing Knowledge Representation in Engineering Databases", 1985, pp. 39-48; IEEE Computer.
Roger N. Shepard, "Representation of Structure in Similarity Data: Problems and Prospects", vol. 39, 1974, pp. 373-421; Psychometrika.
Andrew Ortony, "The Role of Similarity in Similes and Metaphors", 1979, pp. 186-201; Metaphor and Thought; Cambridge Univ. Press.
Itamar Gati and Amos Tversky, "Weighting Common and Distinctive Features in Perceptual and Conceptual Judgments", pp. 341-370, 1984; Cognitive Psychology.
Roger Tourangeau and Robert J. Sternberg, "Aptness in Metaphor", 1981, pp. 27-55; Cognitive Psychology.
Jamie G. Carbonell, CMU Report CMU-CS-85-115, "Derivational Analogy: A Theory of Reconstructive Problem Solving and Expertise Acquisition", pp. 1-21 (1985).
Amos Tversky, "Features of Similarity", vol. 84, 1977, pp. 327-352; Psychological Review, vol. 84, No. 4.

*Primary Examiner*—Joseph Ruggiero
*Attorney, Agent, or Firm*—Fish & Richardson

[57] ABSTRACT

A system for performing iterative specialization and iterative generalization among objects in a set. Initially, an analogy or symmetric comparison operation is performed between a predetermined pair of objects to determine the similarities (and differences if symmetric comparison is performed) between the objects, and to generate respective similarity and difference reference structures. The system then iteratively performs analog or symmetric comparison operations using the previously generated reference structures and the reference structure of the object being processed during the iteration to determine the similarity of difference between the object and the previously determined reference structure.

49 Claims, 5 Drawing Sheets

FIG 1

ITERATIVE GENERALIZATION

10 IDENTIFY OBJECTS A AND B OF SET {A, B, . . .} TO BE USED IN INITIAL ANALOG, EVALUATION

11 PERFORM INITIAL ANALOGY EVALUATION WITH OBJECTS A AND B TO GENERATE ANALOGY SCORE AND JOINT REFERENCE STRUCTURE

YES 12 DETERMINE WHETHER THERE ARE ANY ADDITIONAL OBJECTS TO BE EVALUATED

NO

15 EXIT

13 IDENTIFY NEXT OBJECT IN THE SET TO BE EVALUATED

14 PERFORM ANALOGY EVALUATION USING JOINT REFERENCE STRUCTURE TO GENERATE NEW JOINT REFERENCE STRUCTURE AND ANALOGY SCORE

FIG 2C

SYSTEM FOR SPECIFYING AND EXECUTING PROTOCOLS FOR USING ITERATIVE ANALOGY AND COMPARATIVE INDUCTION IN A MODEL-BASED COMPUTATION SYSTEM

CROSS-REFERENCE TO RELATED PATENT APPLICATION

U.S. patent application Ser. No. 07/032,161, filed Mar. 30, 1987, by David J. Hartzband, et al., for Evaluation System For Determining Analogy And Symmetric Comparison Among Objects In Model-Based Computation Systems, which is incorporated herein by reference.

BACKGROUND OF THE INVENTION

1. Field of the Invention

The invention relates generally to the field of systems for artificial intelligence, and more specifically to systems for identifying and quantifying similarities and differences between and among data objects.

2. Description of the Prior Art

U.S. patent application Ser. No. 07/032,161, filed Mar. 30, 1987, by David J. Hartzband, et al., for Evaluation System For Determining Analogy And Symmetric Comparison Among Objects In Model-Based Computation Systems, which is assigned to the assignee of the present application, describes a system for evaluating analogy and symmetric comparison between and among objects in a model-based computation system. Briefly, each object is defined by an associated object structure and an associated reference structure. The object structure is essentially a table which includes informational elements about the object. The informational elements in the object structure fall into four general types, including an entity identification and the object's attributes, relationships and one or more sets in which the object is included.

The reference structure associated with an object is also essentially a table, including elements identifying various of the object's properties. In particular, an object's reference structure includes the numeric and non-numeric values of the various attributes identified in the object structure and the objects or values for each of the object's relationships as set forth in the object structure. The reference structure also identifies the sets, relationships and attributes of the object, which are taken from the object structure. The elements of an object's reference structure are thus related to the elements of the object's object structure, including values for the various attributes and relationships which the object may have, which are identified without values in the object's object structure.

The system described in the aforementioned patent application evaluates analogy and symmetric comparison among objects in a set of objects. In evaluating analogy between objects in a set, the objects' reference structures are compared, element for element, in a similarity table. The similarity table includes a number of records each for one of the elements in the reference structures for the two objects. If the reference structures for the objects include similar informational elements, even if they are of different values, they are entered in the same record in the similarity table.

If the informational elements in a record in the similarity table are the same or sufficiently similar (as determined by a predetermined similarity criterion), they are assigned a score value. The scores associated with the various elements in the reference structures are assigned or weighted in accordance with weights provided by an operator or calling program to reflect the relative importance of the elements in determining the degree of analogy. The scores produced by the comparison are processed to provide an analogy score which determines the degree of analogy between the objects. The records in the similarity table which provide non-zero score values, that is, the records in which the informational elements of the reference structures of the two objects are sufficiently similar that they result in a contribution to the similarity score, form a reference structure identifying the elements of similarity between the objects.

The system evaluates symmetric comparison in a manner similar to its evaluation of analogy, with the addition that the differences determined during processing of the similarity table result in the generation of a difference table identifying the elements of the objects which are not similar, and a difference score is generated in response to these elements in a manner similar to the similarity score. Thus, the system in symmetric comparison, produces both a similarity reference structure and a difference reference structure and similarity and difference scores. Since symmetric comparison gives both the similarity and difference, the user, or a program which initiated the symmetric comparison evaluation, may determine whether the objects are more similar than different or more different than similar, and the similarity and difference reference structures identify the elements of similarity and difference.

SUMMARY OF THE INVENTION

The invention provides an extension of the evaluation system described in the aforementioned Hartzband, et al., patent application to perform iterative generalization to identify, iteratively, a subset of a set of objects which comprises objects which are similar to the similarities between a predetermined pair of objects, and to perform iterative specialization to identify, iteratively, a two subsets which are, respectively, similar to, and different from, the similarities and differences between a predetermined pair of objects.

In brief summary, the system initially performs a similarity or symmetric comparison operation on a predetermined pair of objects from a set of objects. Thereafter, the system iteratively processes the other objects in the set by way of analogy or symmetric comparison to determine whether the object satisfies the required similarity or difference criteria. The result is a similarity and/or difference score and a similarity and/or difference reference structure to be used in the next iteration.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The details of the object structure and reference structure for an object, and the algorithms for analogy and symmetric comparison are described in the aforementioned U.S. patent application Ser. No. 07/032,161, filed Mar. 30, 1987, by David J. Hartzband, et al., and will not be described here in detail. In general, however, the system described in that patent application performs operations to determine the degree of similarity and difference between and among objects. Objects are associated with and identified by an object structure and a reference structure. Both the object structure and the reference structure have a number of elements. In evaluating analogy and symmetric comparison, a similarity table is generated detailing the similarity and differences between corresponding elements of the reference structures. In evaluating analogy, the comparison of all of the elements of the reference structure provides a value which reflects the degree of similarity between the objects. In addition, a similarity reference structure is generated from the similarity table including elements which are common to the reference structures of the objects under evaluation.

The operations performed in evaluating symmetric comparison are generally similar to the operations performed in evaluating analogy. However, in evaluating symmetric comparison, comparisons are performed on the elements of the reference structure of the objects under consideration, and both similarity and difference reference structures are generated from the similarity table which identify the elements of the reference structures of the respective objects which are similar and different.

Figure 1:
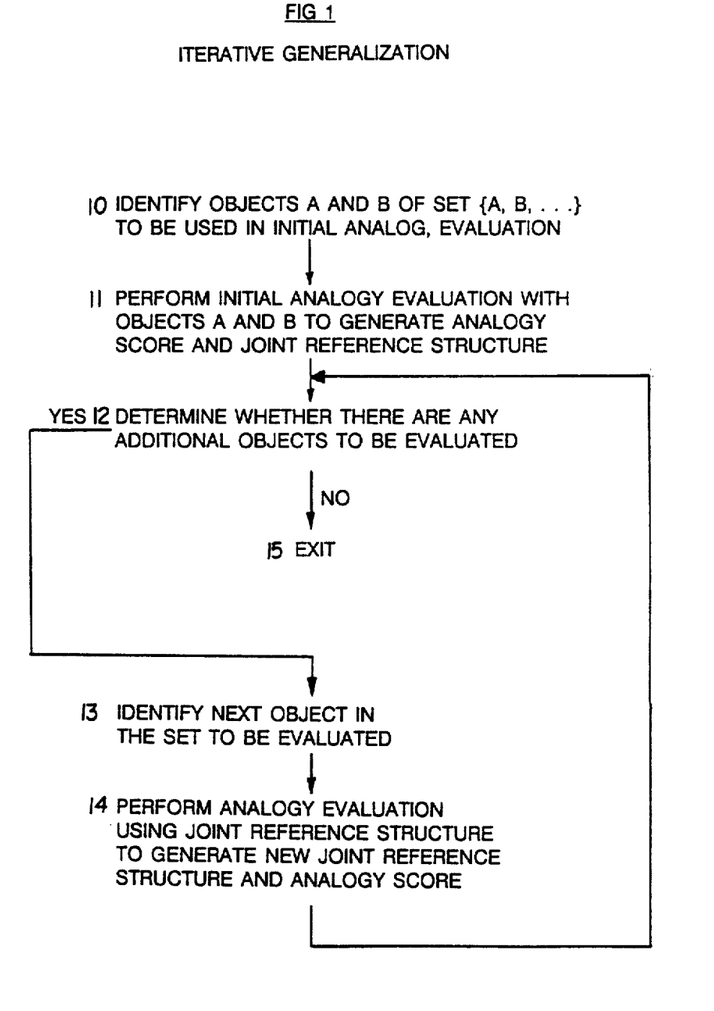
FIG. 1 is a diagram describing operations performed in connection with iterative generalization.
Figure 2:
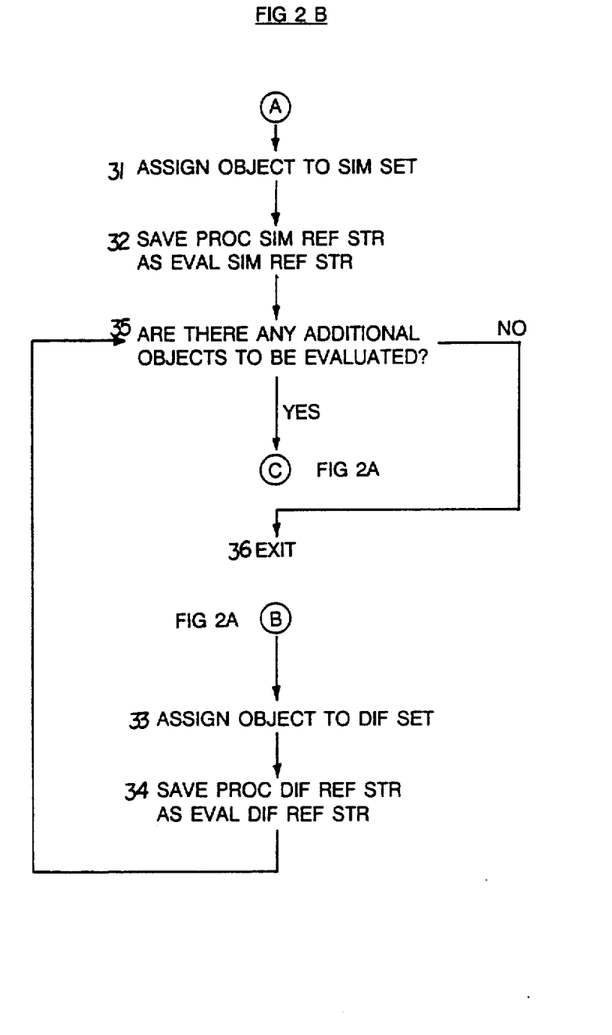
FIGS. 2A through 2D are diagrams describing operations performed in connection with iterative specialization.

The invention provides an evaluation system which is an extension of the analogy and symmetric comparison evaluation system described in the aforementioned application to provide for iterative generalization and specialization. In iterative generalization, which is depicted in FIG. 1, the system iteratively identifies the objects whose reference structures are similar to the reference structure generated during analogy evaluation which was performed during the previous iteration, and generates a joint reference structure covering the set. On the other hand, iterative specialization, which is depicted in FIG. 2, iteratively identifies objects both similarities and differences among objects, and generates reference structures therefor.

The system thus provides reference structures which are useful in evaluating more complex logical questions, such as, evaluating the question, given the objects A, B and C from a set, what other objects "$x_i$" of the set satisfy the relation "object A is to object B as object C is to what objects $x_i$". The evaluation of this relation can be performed by first determining the similarities, or the similarities and differences, between objects A and B, and then determining the similarities, or the similarities and differences, of that result with object C. Following that operation, analogy or symmetric comparison operations can be performed between the resulting similarity reference structure and, if generated (if the operations on objects A, B and C are by way of symmetric comparison), difference reference structure, in connection with objects $x_i$.

The system described here provides the initial processing in connection with objects A, B and C, and the subsequent processing in connection with objects $x_i$ can be by way of analogy or symmetric comparison as described in the aforementioned Hartzband, et al., patent application in connection with reference structures generated during the iterative processing of objects A, B and C.

With reference to FIG. 1, in iterative generalization, the system selects an initial pair of objects, identified as objects A and B, from the set of objects {A, B, . . . } for which analogy is to be evaluated (step 10). These initial objects will be used in an initial analogy evaluation, as described above and in connection with FIGS. 1A through 1C of the aforementioned patent application. After selection, the system performs an analogy operation on objects A and B (step 11) which results in the generation of a joint reference structure and an analogy score. If there are any additional objects in the set for which analogy is to be evaluated (step 12), the system identifies the next object in the set (step 13) and performs an analogy operation (step 14) using the joint reference structure generated in step 11 and the reference structure of the object identified in step 13.

Following step 14, the system returns to step 12 to determine whether there are any additional objects for which analogy is to be evaluated. If so, the system performs the analogy evaluation in steps 13 and 14, using the object's reference structure and the joint reference structure which was determined during the preceding iteration.

The system continues to perform steps 12 through 14 until, in step 12, it determines that there are no further objects to be used in the analogy evaluation. At that point, the system sequences to step 15, in which it exits. The result is an analogy score reflecting the degree of similarity among the objects that were evaluated and a joint reference structure detailing the entries in the respective objects' reference structures which were similar.

Iterative specialization, which is depicted in FIGS. 2A through 2D is somewhat similar, providing scores and joint reference structures detailing the similarities and differences among a set of objects {A, B, . . . }. More specifically, iterative specialization provides a subset of the original set of objects which are determined to be similar to a first pair of objects, and a second subset of objects which are different from the first pair.

Initially, the system performs a symmetric comparison operation in connection with a first pair of objects, to generate a similarity reference structure, a difference reference structure and a score associated with the similarity and difference. Subsequently, the system iteratively processes each of the other objects in the set. During each iteration, the determination of whether an object belongs in the first (similar) subset or the second (different) subset is based on the relative scores determined from a similarity determination and difference determination using the object's reference structure and similar and difference joint reference structures generated during the preceding iteration. At the end of processing, the system provides two subsets of objects, one subset identifying the objects determined to be similar to the original pair of objects, and the other subset identifying the objects determined to be different from the original pair of objects.

Figure 2A:
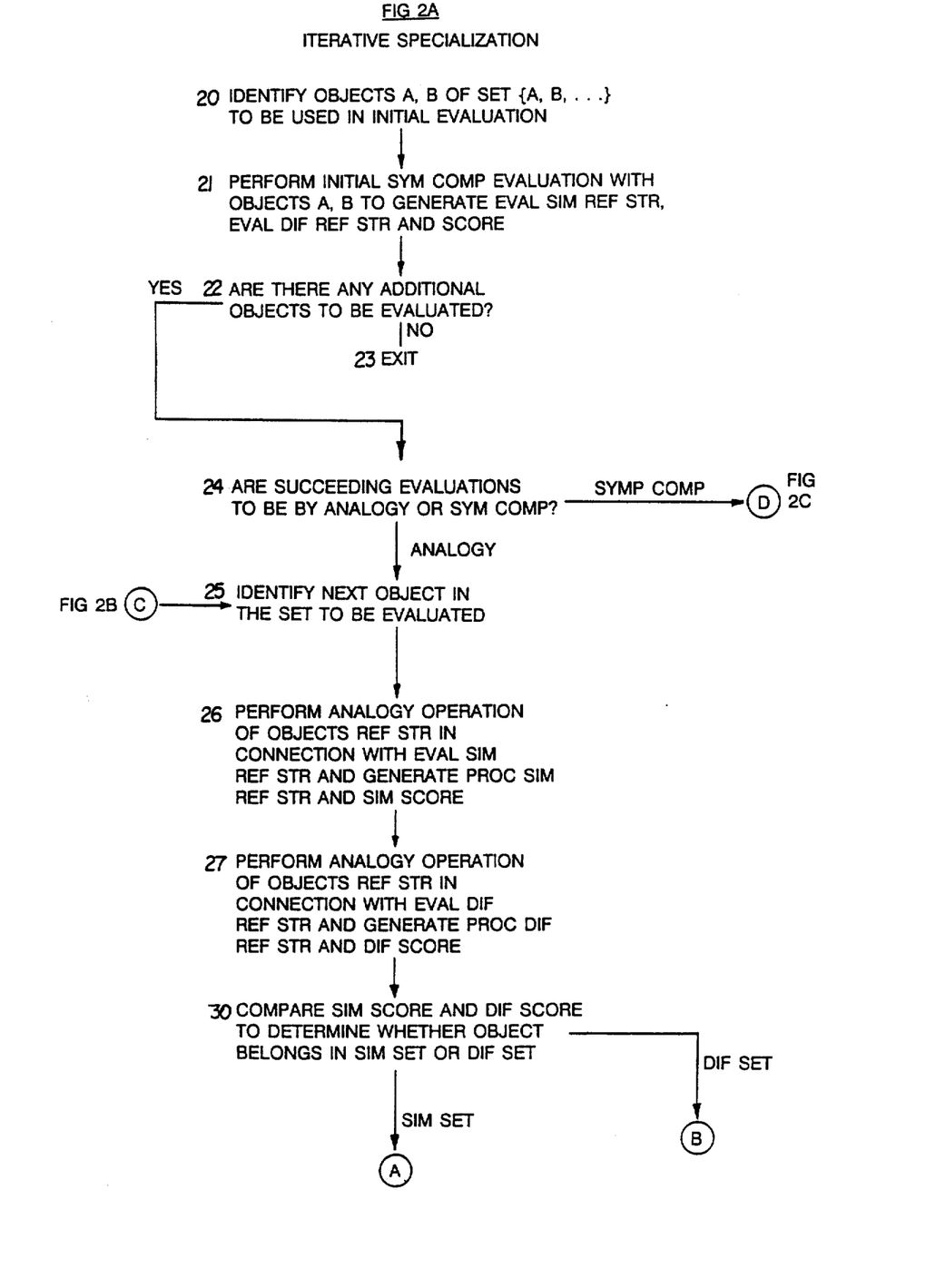

With reference to FIG. 2A, the system first identifies two objects A and B from the set {A, B, . . . } which are to be used in the initial evaluation (step 20). The system then performs an initial symmetric comparison evaluation in connection with objects A and B (step 21). In connection with this, the system performs the steps described in FIG. 3A in the aforementioned Hartzband, et al., patent application. The result of the symmetric comparison evaluation is an EVAL SIM REF STR evaluated similar reference structure, an EVAL DIF REF STR evaluated difference reference structure, and a score identifying the degree of similarity and difference between the objects A and B. The EVAL SIM REF STR evaluated similar reference structure identifies the elements from the two objects' reference structures which are similar, and the EVAL DIF REF STR evaluated difference reference structure identifies the elements from the two objects' reference structures which are not similar.

Following step 21, the system sequences to step 22 to determine if there are any additional objects in the set to be evaluated. If there are only two objects in the set {A, B, . . . }, the system exits at this point (step 23). However, if there are additional objects in the set to be evaluated (step 22), the system sequences to step 24.

In step 24, the algorithm branches based on a determination of whether evaluations in connection with the other objects are to be performed using analogy or symmetric comparison. This determination may be made by an operator or a calling program. Briefly, if evaluations in connection with the other objects in the set are to be performed using analogy, for each object an analogy operation is performed using the object's reference structure in connection with both the EVAL SIM REF STR evaluated similar reference structure and EVAL DIF REF STR evaluated difference reference structure, and a similarity and difference score is generated based on the result. Based on the similarity and difference scores, a decision is made as to whether the object belongs in the similar subset or the difference subset.

If the system determines that object belongs in the similarity subset, the reference structure generated as a result of the analogy operation in connection with the EVAL SIM REF STR evaluated similar reference structure is used as the EVAL SIM REF STR evaluated similar reference structure during the next iteration. On the other hand, if the system determines that object belongs in the difference subset, the reference structure generated as a result of the analogy operation in connection with the EVAL DIF REF STR evaluated difference reference structure is used as the EVAL DIF REF STR evaluated difference reference structure in the next iteration. After all of the objects have been processed, the system provides the identification of objects which are similar to the similarities of the initial pair of objects and the identification of objects which are similar to the differences between the initial pair of objects, an a reference structure for each.

On the other hand, if evaluations in connection with the other objects in the set are to be performed using symmetric comparison, for each object a symmetric comparison operation is performed using the object's reference structure in connection with both the EVAL SIM REF STR evaluated similar reference structure and EVAL DIF REF STR evaluated difference reference structure. As a result, four reference structures and four scores are generated, identifying and quantifying similarities and differences between the object's reference structure and the EVAL SIM REF STR evaluated similar reference structure and the EVAL DIF REF STR evaluated difference reference structure.

Based on the scores, the system determines whether the object belongs in the subset of objects whose reference structures indicate that they are similar to the similarities between the original pair of objects, or the subset of objects whose reference structures indicate that they are similar to the differences between the original pair of objects. In addition, the system determines whether the object belongs to one of two additional subsets, namely, a subset of objects whose reference structures indicate that they are different from the similarities of the original pair of objects, or the subset of objects whose reference structures indicate that they are different from the differences between the original pair of objects.

With this background, with reference again to FIG. 2A, if the system determines that succeeding evaluations are to be by way of analogy, it sequences to step 25, in which it identifies the next object in the set {C, . . . } to be evaluated. The system then performs an analogy operation in connection with the object's reference structure and the EVAL SIM REF STR evaluated similar reference structure to produce a PROC SIM REF STR processed similarity reference structure and a similarity score (step 26). The operations performed in connection with this operation are described in the aforementioned Hartzband, et al., patent application, particularly in connection with FIGS. 2A through 2C.

Following step 26, the system performs an analogy operation in connection with the object's reference structure and the EVAL DIF REF STR evaluated difference reference structure to produce a PROC DIF REF STR processed difference reference structure and a difference score. The operations performed in connection with this step are similar to those performed in connection with step 26, except that the EVAL DIF REF STR evaluated difference reference structure is used in step 27 instead of the EVAL SIM REF STR evaluated similar reference structure which is used in step 26.

The system then performs a determination of whether the object belongs in the subset of similar objects or the subset of different objects. In this operation, the system may compare the similarity and difference scores generated during steps 26 and 27 (step 30). If the system determines that the object belongs in the subset of similar objects, it sequences to step 31 (FIG. 2B) in which it assigns the object to the subset of similar objects and saves the PROC SIM REF STR processed similar reference structure as the EVAL SIM REF STR evaluated similar reference structure to be used during a subsequent iteration (step 32).

On the other hand, if, in step 30 (FIG. 2A), the system determines that the object belongs in the subset of different objects, it sequences to step 33 (FIG. 2B) in which it assigns the object to the subset of different objects and saves the PROC DIF REF STR processed difference reference structure generated during step 27 as the EVAL DIF REF STR evaluated difference reference structure to be used during the next iteration (step 34).

Following either step 32 or step 34, the system sequences to step 35 to determine whether there are any additional objects to be evaluated. If so, it sequences to step 25 (FIG. 2A) to perform an evaluation in connection with the next object. After all of objects have been evaluated, the system exits (step 36) returning the two object subsets and the EVAL SIM REF STR evaluated similar reference structure and EVAL DIF REF STR evaluated difference reference structure.

Figure 2C:
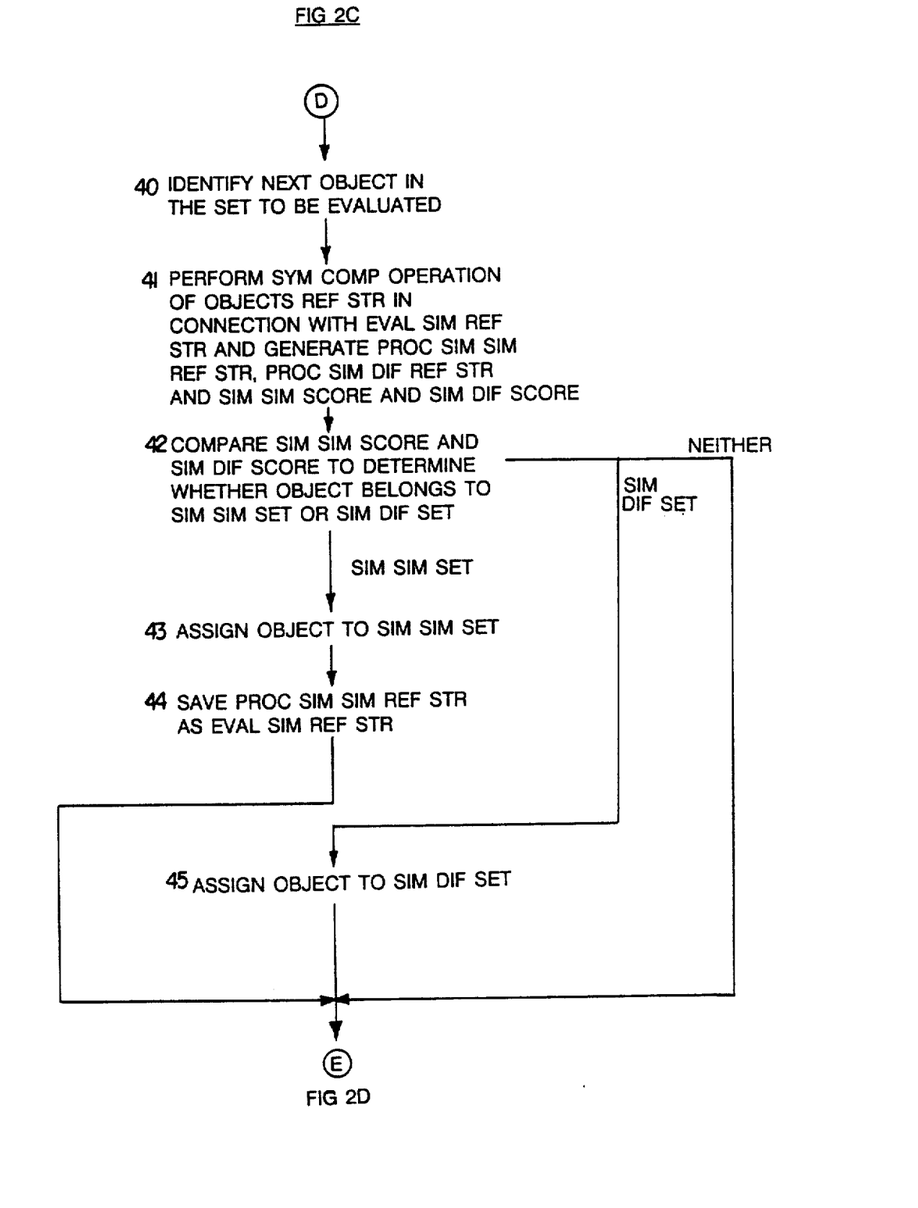
Figure 2D:
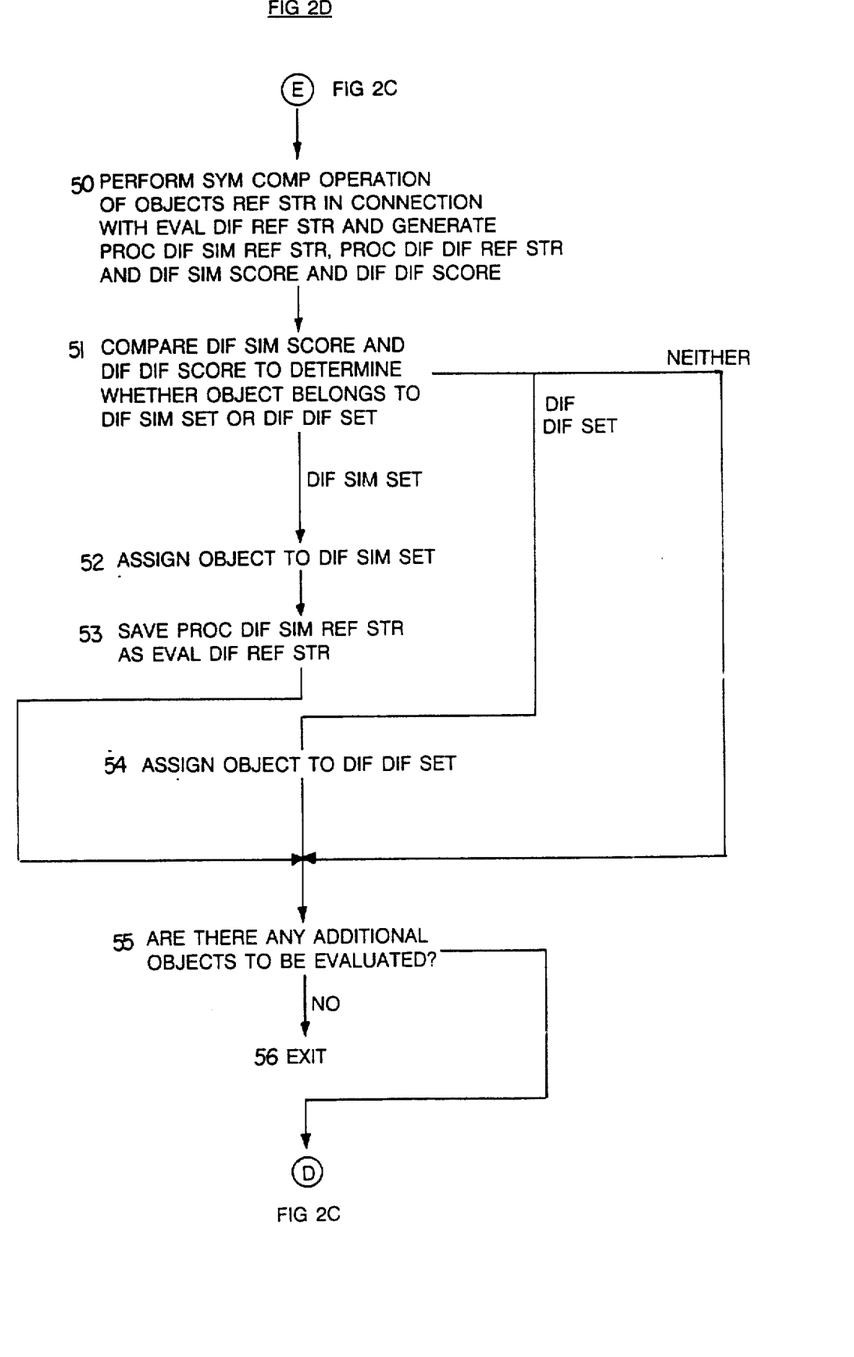

Returning to step 24 (FIG. 2A), the system may determine that subsequent operations are to be performed by way of symmetric comparison. As noted above, if the system performs subsequent operations by way of symmetric comparison, it performs a symmetric comparison operation in connection with both the EVAL SIM REF STR evaluated similar reference structure and the EVAL DIF REF STR evaluated difference reference structure. The operations performed in connection with the EVAL SIM REF STR evaluated similar reference structure are depicted in steps 41 through 46 (FIG. 2C), and the operations performed in connection with the EVAL DIF REF STR evaluated difference reference structure are depicted in steps 50 through 55 (FIG. 2D).

In performing the symmetric comparison operations in connection with the EVAL SIM REF STR evaluated similar reference structure the system generates a PROC SIM SIM REF STR processed similar reference structure (during the similarity evaluation) and a PROC SIM DIF REF STR processed difference reference structure (during the similarity evaluation), and scores for each. Based on the scores, the system determines whether the object belongs in a SIM SIM similar (during the similarity evaluation) subset or a SIM DIF different (during the similarity evaluation) subset.

Similarly, in performing the symmetric comparison operations in connection with the EVAL DIF REF STR evaluated difference reference structure the system generates a PROC DIF SIM REF STR processed similar reference structure (during the difference evaluation) and a PROC DIF DIF REF STR processed difference reference structure (during the difference evaluation), and scores for each. Based on the scores, the system determines whether the object belongs in a DIF SIM similar (during the difference evaluation) subset or a DIF DIF different (during the difference evaluation) subset.

More specifically, after the system has determined in step 24 that subsequent iterative specialization operations are to performed by way of symmetric comparison, it sequences to step 40 (FIG. 2C), in which it identifies the next object in the set {C, . . . } to be evaluated. The system then performs a symmetric comparison operation using the object's reference structure and the EVAL SIM REF STR evaluated similar reference structure (step 41). As noted above, the EVAL SIM REF STR evaluated similar reference structure used in the first iteration is generated during step 21 (FIG. 2A) during the symmetric operation performed in connection with the initial pair of objects A and B. During the symmetric comparison operation in step 41, the system generates the PROC SIM SIM REF STR processed similar reference structure (during the similarity evaluation), a SIM SIM similarity (during the similarity evaluation) score, the PROC SIM DIF REF STR processed difference reference structure and a SIM DIF difference (during a similarity operation) score.

The system then compares the SIM SIM similar (during the similarity evaluation) and SIM DIF difference (during the similarity evaluation) scores to determine whether the object belongs to a SIM SIM similar (with reference to the similarity operation) subset or SIM DIF different (with reference to the similarity operation) subset. If the system determines that the object belongs to the SIM SIM similar (with reference to the similarity operation) subset, it sequences to step 43, in which it assigns the object to the SIM SIM subset and saves the PROC SIM SIM REF STR processed similar reference structure (during the similarity evaluation) as the EVAL SIM REF STR evaluated similar reference structure (step 44) for use during processing in connection with the next object during the next iteration.

On the other hand, if the system determines, in step 42, that the object belongs in the SIM DIF different (with reference to the similarity operation) subset, it sequences to step 45, in which it assigns the object to the SIM DIF subset. In this situation, the system need not generate a new EVAL SIM REF STR evaluated similar reference structure for use during the next iteration, since it uses the EVAL SIM REF STR evaluated similar reference structure used during this iteration during the next iteration.

Following steps 44 or 45, or following step 42 if the system determines in that step that the object does not belong in either the SIM SIM similar (with reference to the similarity operation) subset or SIM DIF different (with reference to the similarity operation) subset, the system sequences to step 50, in which it performs a symmetric comparison operation in connection with the object's reference structure and the EVAL DIF REF STR evaluated difference reference structure which was generated during step 21 (FIG. 2A). In that operation, the system generates a PROC DIF SIM REF STR processed similar reference structure (during the difference operation) and a DIF SIM similarity (with reference to the difference operation) score, a PROC DIF DIF REF STR processed difference reference structure (during the difference operation) and a DIF DIF difference (with reference to the difference operation) score.

Following step 50, the system sequences to step 51, in which it compares the DIF SIM similar (with reference to the difference operation) score and the DIF DIF difference (with reference to the difference operation) score to determine whether the object belongs in the DIF SIM similar (with reference to the difference operation) subset or the DIF DIF different (with reference to the difference operation) subset. If the system determines that the object belongs in the DIF DIF subset, it then assigns the object to that subset (step 52) and saves the PROC DIF DIF REF STR processed difference reference structure (with reference to the difference operation) as the EVAL DIF REF STR evaluated difference reference structure which is used in the next iteration in evaluation for the next object (step 53).

On the other hand, if the system, in step 51, determines that the object belongs in the DIF SIM similar (with reference to the difference operation) subset, it sequences to step 54 in which it assigns the object to the DIF SIM similar (with reference to the difference operation) subset.

Following steps 53 or 54, or step 51 if the system determines that the object belongs to neither the DIF SIM similar (with reference to the difference operation) subset or the DIF DIF different (with reference to the difference operation) subset, it sequences to step 55, in which it determines whether there are any additional objects to be evaluated. If so, it returns to step 40 (FIG. 2C) to evaluate the next object. If there are no further objects to be evaluated, the system sequences to step 57, in which it exits. The results of the evaluation include the four subsets SIM SIM similar and SIM DIF different (both with reference to the similarity operation), and DIF SIM similar and DIF DIF different (both with reference to the difference operation. In addition, the results include the EVAL SIM REF STR evaluated similar reference structure, which represents the iteratively determined reference structure for the objects in the SIM SIM similar (with reference to the similarity operation) subset and the EVAL DIF REF STR evaluated difference reference structure, which represents the iteratively determined reference structure for the objects in the DIF SIM similar (with reference to the difference operation.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for iteratively performing logical evaluation operations in connection with a set of objects, each having an associated reference structure, comprising:
  A. initial evaluation means for performing a logical evaluation operation in connection with a predetermined pair of objects from said set to generate an evaluation reference structure identifying selected relationships between the reference structures of said predetermined pair of objects; and
  B. iterative evaluation means for iteratively performing a logical evaluation operation in connection with the reference structure of each of the objects in said set and a previously generated reference structure to produce a reference structure to be used during a succeeding iteration and a score identifying a similarity relationship between the object's reference structure and a reference structure generated during a previous iteration.

2. A method of performing logical evaluation among a set of objects, each being associated with an object structure and a reference structure, and each reference structure having a set of characteristic fields, comprising the steps of:
  selecting two objects from the set;
  performing an initial logical evaluation operation in connection with said selected objects to generate a score and an evaluation reference structure;
  iteratively performing a second logical evaluation operation for each of the remaining objects in the set.

3. The method of claim 2 wherein said initial logical evaluation operation comprises the steps of: comparing the reference structure associated with one of said selected objects with the reference structure associated with the other of said selected object; and
  generating an evaluation reference structure and a score.

4. The method of claim 2 wherein the step of performing an initial logical evaluating operation comprises the steps of:
  comparing the characteristic fields of the reference structures of said selected objects; and
  entering the characteristic fields into a record in a similarity table if said characteristic fields are similar, said records of said similar characteristic fields in said similarity table thereby forming said evaluation reference structure.

5. The method of claim 2 wherein said second logical evaluation operation comprises the steps of selecting one of said remaining objects and comparing the reference structure of said selected remaining object with said evaluation reference structure, thereby generating a new score and a new evaluation reference structure which is substituted for the evaluation reference structure in a subsequent iteration.

6. A method of performing iterative specialization among a set of objects, each object being associated with an objects structure and a reference structure, comprising the steps of:
  A. selecting two objects from the set;
  B. performing an initial logical evaluation operation in connection with said selected objects to generate, a score, an evaluated similar reference structure and an evaluated difference reference structure;
  C. iteratively:
    i. selecting one of the remaining objects;
    ii. performing a second logical evaluation operation on said selected remaining object, and
    iii. assigning said selected remaining object into one of a group of evaluation sets as determined by the results of said second logical evaluation operation.

7. The method of claim 6 wherein the second logical evaluation operation comprises the steps of:
  performing an analogy operation on said reference structure of said selected remaining object with said evaluated similar reference structure to generate a processed similar reference structure and similarity score;
  performing an analogy operation on said reference structure of said selected remaining object with said evaluated difference reference structure to generate a processed difference reference structure and difference score;
  comparing said similarity score and said difference score;
  assigning said selected remaining object to one of the plurality of evaluation sets as a result of said comparison;
  saving said processed similar reference structure as the evaluated similar reference structure if said selected remaining object is assigned to a similar set; and
  saving said processed difference reference structure as the evaluated difference reference structure if said selected remaining object is assigned to said different set.

8. The method of claim 6 wherein said initial logical evaluation operation is a symmetric comparison operation.

9. The method of claim 6 wherein the second logical evaluation operation comprises the steps of:
  performing a symmetric comparison operation on said reference structure of said selected remaining object with said evaluated similar reference structure to generate a processed similar similar reference structure, a processed similar difference reference structure, a similar similar score and a similar different score;
  comparing said similar similar score and said similar different score;
  assigning said selected remaining object to a similar similar set or a similar different set or neither set as determined by said comparison;

saving the processed similar similar reference structure as the evaluated similar reference structure if said selected remaining object is assigned to said similar similar set;

performing a symmetric comparison operation on said reference structure of said selected remaining object with said evaluated difference reference structure to generate a processed difference similar reference structure, a processed difference difference reference structure, a different similar score and a different different score;

comparing said different similar score and said different different score;

assigning said selected remaining object to said different similar set or said different different set or neither set is a result of said comparison; and saving the processed difference similar reference structure as the evaluated difference reference structure if said selected remaining object is assigned to said different similar set.

10. A method for generating a plurality of sets of objects from an original set of objects, each of said objects having a reference structure, comprising the steps of:

A. selecting a pair of objects;

B. performing an initial logical evaluation in connection with said selected objects to generate an evaluated similar reference structure, an evaluated difference reference structure and a score;

C. iteratively:
  i. selecting one of said remaining objects,
  ii. performing said second logical evaluation operation on said selected remaining object, and
  iii. assigning said selected remaining object to one of said plurality of sets as a result of said second logical evaluation operation.

11. The method of claim 10 wherein said second logical evaluation operation comprises the steps of:

performing a symmetric comparison operation between the reference structure of said selected remaining object and the evaluated similarity reference structure thereby generating a new evaluated similar reference structure to be used in succeeding evaluations, and a similarity score;

performing an analogy operation between said reference structure of said selected remaining object and said evaluated difference reference structure thereby generating a new evaluated difference reference structure, to be used in succeeding evaluations, and a difference score;

comparing said similarity and said difference scores; and assigning said selected remaining object to one of the plurality of sets as determined by said comparison.

12. The method of claim 10 wherein said second logical evaluation operation comprises the steps of:

performing a symmetric comparison operation between the reference structure of said selected remaining object and the evaluated similarity reference structure thereby generating a processed similar similar reference structure, a processed similar difference reference structure, a similar similar score and a similar different score;

comparing the similar similar score and the similar different score;

assigning said selected remaining object to a similar similar set or a similar different set as determined by the results of the comparison;

saving the processed similar similar reference structure as the evaluated similar reference structure if said selected remaining object is assigned to the similar similar set;

performing a symmetric comparison operation between the reference structure of the selected remaining object and the evaluated difference reference structure thereby generating a processed difference similar reference structure, a processed difference difference reference structure, a different similar score and a different different score;

comparing the different similar score and the different different score;

assigning said selected remaining object to a different similar set or a different different set as determined by the results of the comparison; and saving the processed difference similar reference structure as the evaluated difference reference structure if said selected remaining object is assigned to the different similar set.

13. The system of claim 1 wherein said initial evaluation means comprises:

a means for comparing the reference structures associated with each of the predetermined pair of objects; and a means for generating said evaluation reference structure and a score in response to said comparison.

14. The system of claim 1 wherein said iterative evaluation means comprises:

a means for selecting one of the remaining objects in said set;

a means for comparing said reference structure of said selected remaining object and the reference structure generated during a previous iteration; and a means for generating, in response to said comparison, a new score and a new reference structure to be used during a succeeding iteration.

15. A system for performing iterative generalization among a set of objects, each being associated with an object structure and a reference structure, and each reference structure having a set of characteristic fields, said system comprising:

a means for selecting two objects from the set;

a means for performing an initial logical evaluation operation in connection with said selected objects to generate a score and a joint reference structure;

a means for iteratively performing a second logical evaluation operation for each of the remaining objects in the set.

16. The system of claim 15 wherein said means for performing said second logical evaluation operation comprises means for selecting one of said remaining objects and means for comparing the reference structure of said selected remaining object with said joint reference structure to thereby generate a new score and a new joint reference structure which is substituted for the joint reference structure in a subsequent iteration.

17. The system of claim 15 wherein said means for said initial logical evaluation operation comprises:

a means for comparing the reference structure associated with one of said selected objects with the reference structure associated with the other of said selected objects; and a means for generating a joint reference structure and a score in response to the comparison.

18. The system of claim 15 wherein the means for said initial logical evaluation operation comprises:

a means for comparing the characteristic fields of the reference structures of said selected objects; and a means for entering the characteristic fields into a record in a similarity table if said characteristic fields are similar, said records of said similar characteristic fields in said similarity table thereby forming a said joint reference structure.

19. A system for performing iterative specialization among a set of objects, each object being associated with an object structure and a reference structure, comprising:

a means for selecting two objects from the set;

a means for performing an initial logical evaluation operation in connection with said selected objects, thereby generating a score, an evaluated similar reference structure and an evaluated difference reference structure;

a means for iteratively performing a second logical evaluation operation for each of the remaining objects in the set, thereby assigning said selected remaining object into one of a plurality of evaluation sets.

20. The system of claim 19 wherein the means for iteratively performing said second logical evaluation operation comprises:

a means for performing an analogy operation on said reference structure of said selected remaining object with said evaluated similar reference structure to thereby generate a processed similarity reference structure and similarity score;

a means for performing an analogy operation on the reference structure of said selected remaining object with said evaluated difference reference structure to thereby generate a processed difference reference structure and similarity score;

a means for comparing said similarity score and said difference score;

a means for assigning said selected remaining object to one of the plurality of sets as a result of said comparison;

a means for saving said processed similar reference structure as the evaluated similar reference structure if said selected remaining object is assigned to a similar set; and a means for saving said processed difference reference structure as the evaluated difference reference structure if said selected remaining object is assigned to a different set.

21. The system of claim 19 wherein the means for performing the second logical evaluation operation comprises:

a means for performing a symmetric comparison operation on said reference structure of said selected remaining object with said evaluated similar reference structure to thereby generate a processed similar similar reference structure, a processed similar difference reference structure, a similar similar score and a similar different score;

a means for comparing said similar similar score and said similar different score;

a means for assigning said selected remaining object to a similar similar set or a similar different set or neither set as determined by said comparison;

a means for saving the processed similar similar reference structure as the evaluated similar reference structure if said selected remaining object is assigned to said similar similar set;

a means for performing a symmetric comparison operation on said reference structure of said selected remaining object with said evaluated difference reference structure to thereby generate a processed difference similar reference structure, a processed difference difference reference structure, a different similar score and a different different score;

a means for comparing said different similar score and said different different score;

a means for assigning said selected remaining object to said different similar set or said different different set or neither set as a result of said comparison; and a means for saving the processed difference similar reference structure as the evaluated difference reference structure if said selected remaining object is assigned to said different similar set.

22. A system for generating a plurality of sets of objects from an original set of objects, each of said objects having a reference structure, comprising:

A. a means for selecting a pair of objects;

B. a means for performing an initial logical evaluation operation in connection with said selected objects to generate and evaluated similar reference structure, an evaluated difference reference structure and a score;

C. a means for iteratively:
  i. selecting one of said remaining objects;
  ii. evaluating said selected remaining object by said second logical evaluation operation; and D. a means for assigning said selected remaining object to one of said plurality of sets as a result of said second logical evaluation operation.

23. The system of claim 22 wherein said means for performing said second logical evaluation operation comprises:

a means for performing an analogy operation in connection with said reference structure of said object selected from said objects, and said evaluated similar reference structure to thereby generate a new evaluated similar reference structure, to be used in succeeding evaluations, and a similarity score;

a means for performing an analogy operation between said reference structure of said selected remaining object and said evaluated difference reference structure to thereby generate a new evaluated difference reference structure, to be used in succeeding evaluations, and a difference score;

a means for comparing said similarity and said difference scores; and a means for assigning said selected remaining object to one of the plurality of sets as determined by said comparison.

24. The system of claim 22 wherein said means for performing said second logical evaluation operation comprises:

a means for performing a symmetric comparison operation between the reference structure of the selected remaining object and the evaluated similarity reference structure to thereby generate a processed similar similar reference structure, a processed similar difference reference structure, a similar similar score and a similar different score;

a means for comparing the similar similar score and the similar different score;

a means for assigning the selected remaining object to a similar similar set or a similar different set as determined by the results of the comparison;

a means for saving the processed similar similar reference structure as the evaluated similar reference structure if said selected remaining object is assigned to the similar similar set;

a means for performing a symmetric comparison operation between the reference structure of said selected remaining object and the evaluated difference reference structure to thereby generate a difference similar reference structure, a difference difference reference structure, a different similar score and a different different score;

a means for comparing the different similar score and the different different score;

a means for assigning said selected remaining object to a different similar set or a different different set as determined by the results of the comparison; and a means for saving the processed difference similar reference structure as the evaluated difference reference structure if said selected remaining object is assigned to the different similar set.

25. The system of claim 19 wherein said means for performing said initial logical evaluation operation performs a symmetric comparison operation.

26. The method of claim 2 wherein the initial logical evaluation operation is an analogy operation.

27. The method of claim 2 wherein the second logical evaluation operation is an analogy operation.

28. A system comprising:
A. object maintaining means for maintaining a set of objects, each having an associated reference structure;
B. logical evaluation means for performing a logical evaluation in connection with two reference structures to generate a new reference structure and a score; and
C. a control means coupled to said object maintaining means and said logical evaluation means for, during an initial iteration, initially selecting two objects maintained by said object maintaining means and enabling said logical evaluation means to generate a new reference structure and score in connection with their associated reference structures, and for thereafter iteratively selecting one of the other objects maintained by the object maintaining means and enabling said logical evaluation means to generate a new reference structure and a new score in connection with the reference structure associated with the object selected during the iteration and the new reference structure generated by the logical evaluation operation means during the previous iteration.

29. The system of claim 28 wherein each said associated reference structure comprises a set of characteristic fields, said logical evaluation means performing said logical evaluation in connection with said characteristic fields.

30. The system of claim 28 wherein said control means enables said logical evaluation means to perform an analogy operation during said initial iteration.

31. The system of claim 30 wherein said control means enables said logical evaluation means to perform an analogy operation during a subsequent iteration.

32. The system of claim 28 wherein said control means enables said logical evaluation means to perform a symmetric comparison operation during said initial iteration.

33. The system of claim 32 wherein said logical evaluation means generates a new reference structure during the symmetric comparison operation, said new reference structure comprising an evaluated similar reference structure and an evaluated difference reference structure.

34. The system of claim 33 wherein said logical evaluation during a subsequent iteration comprises a first and a second analogy operation, one of said analogy operations generating a processed similar reference structure, and the other of said analogy operations a processed different reference structure.

35. The system of claim 34 wherein the new score generated during one of said analogy operations is a similarity score and the new score generated during the other of said analogy operations is a difference score.

36. The system of claim 35 wherein said logical evaluation during said subsequent iteration further comprises a comparison operation on said similarity score and said difference score.

37. The system of claim 36 wherein said logical evaluation during said subsequent iteration further comprises an assignment operation which assigns said object selected during said iteration to one of a plurality of sets as a result of said comparison operation.

38. The system of claim 37 wherein said plurality of sets comprises a similar set and a different set.

39. The system of claim 38 wherein said logical evaluation during said subsequent iteration further comprises a saving operation wherein said processed similar reference structure is saved as the evaluated similar reference structure if said object selected during said iteration is assigned to said similar set and said processed different reference structure is saved as the evaluated difference reference structure if said object selected during said iteration is assigned to said different set.

40. The system of claim 33 wherein said logical evaluation during a subsequent iteration comprises a first and a second symmetric comparison operation, one of said symmetric comparison operations generating a processed similar similar reference structure and a processed similar different reference structure and the other of said symmetric comparison operations generating a processed difference similar reference structure and processed difference difference reference structure.

41. The system of claim 40 wherein one of said symmetric comparison operations generates a similar similar score and a similar different score and the other of said symmetric comparison operations generated a different different score and a different similar score.

42. The system of claim 41 wherein said logical evaluation during said subsequent iteration further comprises a comparison operation on said different similar score and said different different score.

43. The system of claim 42 wherein said logical evaluation during said subsequent iteration further comprises an assignment operation which assigns said object selected during said iteration to one of a plurality of sets as a result of said comparison operation.

44. The system of claim 43 wherein said plurality of sets comprises a different similar set, a different different set, and a neither set.

45. The system of claim 44 wherein said logical evaluation during said subsequent iteration further comprises a saving operation wherein said processed different similar reference structure is saved as the evaluated different reference structure if said object selected during said iteration is assigned to said different similar set.

46. The system of claim 40 wherein said logical evaluation during said subsequent iteration further comprises a comparison operation on said similar similar score and said similar different score.

47. The system of claim 46 wherein said logical evaluation during said subsequent iteration further comprises an assignment operation which assigns said object selected during said iteration to one of a plurality of sets as a result of said comparison operation.

48. The system of claim 47 wherein said plurality of sets comprises a similar similar set and a similar different set.

49. The system of claim 48 wherein said logical evaluation during said subsequent iteration further comprises a saving operation wherein said processed similar similar reference structure is saved as the evaluated similar reference structure if said object selected during said iteration is assigned to said similar similar set.

* * * * *

UNITED STATES PATENT AND TRADEMARK OFFICE
CERTIFICATE OF CORRECTION

PATENT NO. : 4,899,290

DATED : February 6, 1990

INVENTOR(S) : David J. Hartzband

It is certified that error appears in the above-identified patent and that said Letters Patent is hereby corrected as shown below:

Column 10, line 11, "objects" should be --object--.

Column 11, line 39-40, delete "a symmetric comparison operation between the" and insert --an analogy operation in connection with said--.

Column 11, line 41, change "the" to --said--.

Column 11, line 41, change "similarity" to --similar--.

Signed and Sealed this

Eighteenth Day of February, 1992

Attest:

HARRY F. MANBECK, JR.

*Attesting Officer*     *Commissioner of Patents and Trademarks*